United States Patent [19]

Pear

[11] 4,419,715
[45] Dec. 6, 1983

[54] BUS BAR ASSEMBLY FOR PANELBOARDS AND SWITCHBOARDS

[75] Inventor: Daniel G. Pear, Peru, Ind.

[73] Assignee: Square D Company, Palatine, Ill.

[21] Appl. No.: 251,424

[22] Filed: Apr. 6, 1981

[51] Int. Cl.³ .............................................. H02B 1/20
[52] U.S. Cl. ................................ 361/335; 339/22 B;
174/133 B; 174/171; 361/361
[58] Field of Search ...................... 339/22 B, 176 M;
174/129 B, 133 B, 149 B, 171; 361/335–338,
341, 346, 353–355, 361, 363, 378

[56] References Cited

U.S. PATENT DOCUMENTS

| | | | |
|---|---|---|---|
| 3,210,716 | 10/1965 | Meacham | 174/171 |
| 3,243,663 | 3/1966 | Rowe | 361/355 |
| 3,339,038 | 8/1967 | Jorgensen | 339/22 B |
| 3,786,313 | 1/1974 | Coles | 174/133 B |
| 4,157,582 | 6/1979 | Myers | 361/353 |

Primary Examiner—G. P. Tolin
Attorney, Agent, or Firm—Larry I. Golden; Richard T. Guttman

[57] ABSTRACT

A versatilely cnnectible bus bar assembly adapted to carry 200-800 amperes in a panelboard or switchboard environment. The assembly includes a plurality of aluminum bus bars having generally rectangular cross-section bases and integrally connected generally U-shaped cross-sectioned plug-on protions extending throughout the length of the bus bars along the top part of the base. The plug-on portion is provided with inwardly directed nubs designed to prevent improper jaw connection. The bottom of each base includes a T-shaped slot extending throughout the length of the bus bar. Each of the bus bars is supported by a plurality of insulating bases, each of which includes a separate channel in engagement with the base of each bus bar. Each bus bar is fastened to each base by a T-bolt and nut. The head of the bolts are received in the T-shaped slot of the bus bars and the nuts are received in recesses provided on the underside of the base. Outwardly directed lips extending throughout the length of the bus bars also aid in the dissipation of heat.

13 Claims, 7 Drawing Figures

BUS BAR ASSEMBLY FOR PANELBOARDS AND SWITCHBOARDS

BACKGROUND OF THE INVENTION

This invention relates to an improved bus bar assembly for use in electrical switchboards and panelboards.

DESCRIPTION OF PRIOR ART

Heretofore, various configurations have been used for bus bars in panelboards or switchboards, depending upon the required current capacity. For example, while a hollow tube bus bar might be used to extend currents up to 200 amperes through such equipment, a solid tube might be used for carrying currents up to 400 amperes. The solid tube might be used with a rectangular bar for carrying currents up to 600 amperes while a larger rectangular bar could be added below the first rectangular bar in order to carry up to 800 amperes. The latter arrangement, with the three bus bars mounted on an insulator base, is shown in FIG. 7 of the Drawings.

These bus bars would ordinarily be secured to the insulators at predetermined locations through the use of bolts or some similar fastening device. It would also require substantial effort in order to detach each bus bar from the insulators and modify the bus bar configuration for carrying greater or lesser currents.

SUMMARY OF INVENTION

In accordance with the present invention, a bus bar assembly is provided for use in a panelboard or switchboard wherein each bus bar may carry anywhere from 200 to 800 amperes and is adapted for plug-on connection to switches at any point along its length. The cross-sectional configuration of these bus bars provide an increased surface area over many bars which have heretofore been used. Greater heat dissipation is thereby provided.

A T-slotted base provides for adjustable connection to an incoming or outgoing bus bar as well as to an insulating base while also fostering heat dissipation.

The plug-on portion of the bus bars facilitate heat dissipation while providing strength and rigidity at the points of contact with plug-on connectors.

Various other objects and advantages will become apparent from the following description and claims wherein reference is made to the accompanying Drawings.

DESCRIPTION OF THE PREFERRED EMBODIMENT

Figure 1:
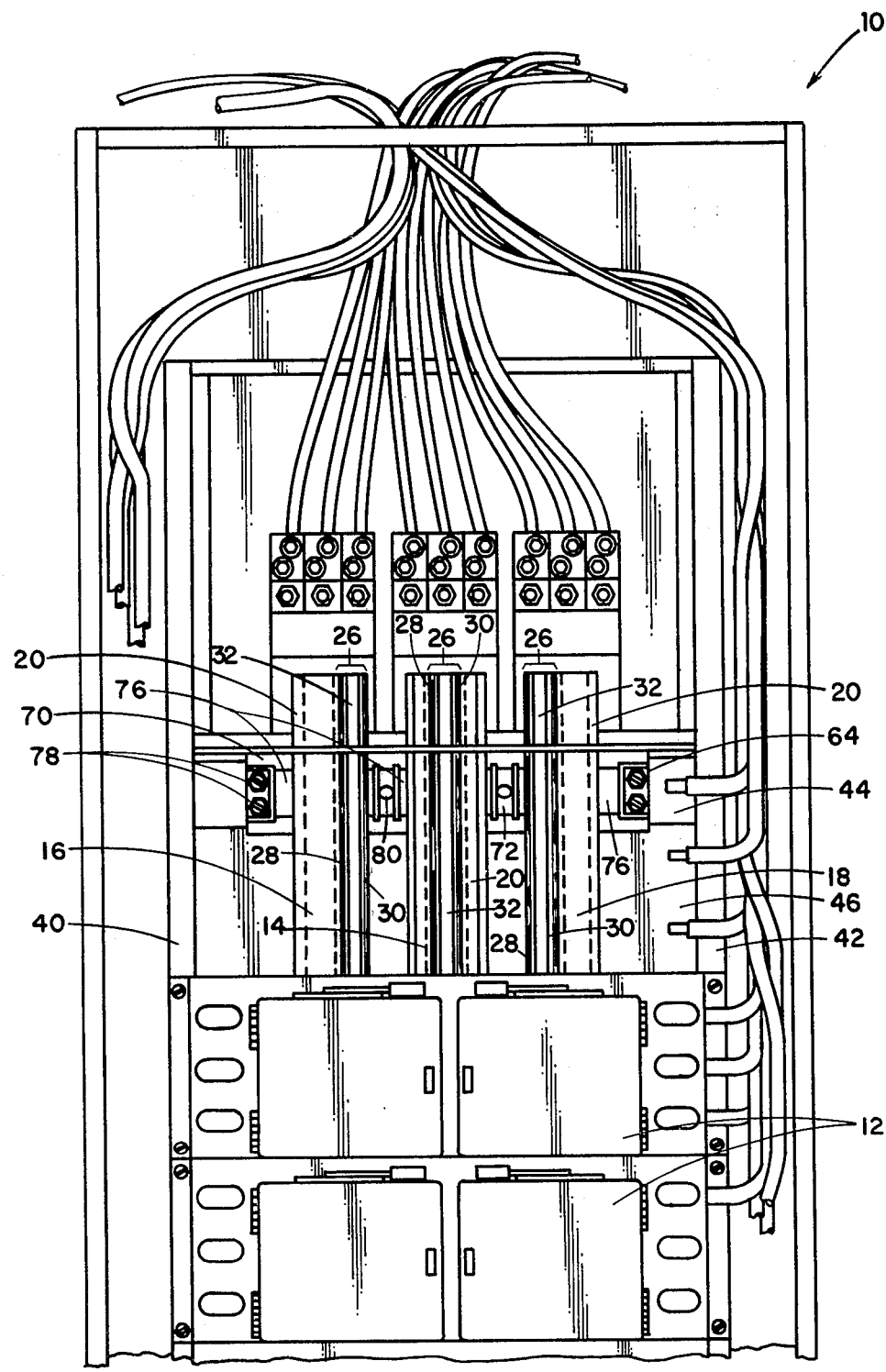
FIG. 1 is a plan view of an open panelboard embodying the principles of the present invention.

Referring to FIG. 1, an open panelboard generally indicated by reference character 10 is shown incorporating the bus bar assembly of the present invention which provides power to equipment through fusible switches 12. The bus bar assembly includes a center bus bar 14 and outer bus bars 16 and 18. Each bar is well suited to carry currents in the 200–800 ampere range, is readily connectible to switches anywhere along its length along its top side and is adapted to be connected on an opposite side anywhere along its length to an insulator or incoming or outgoing line connector.

Figure 2:
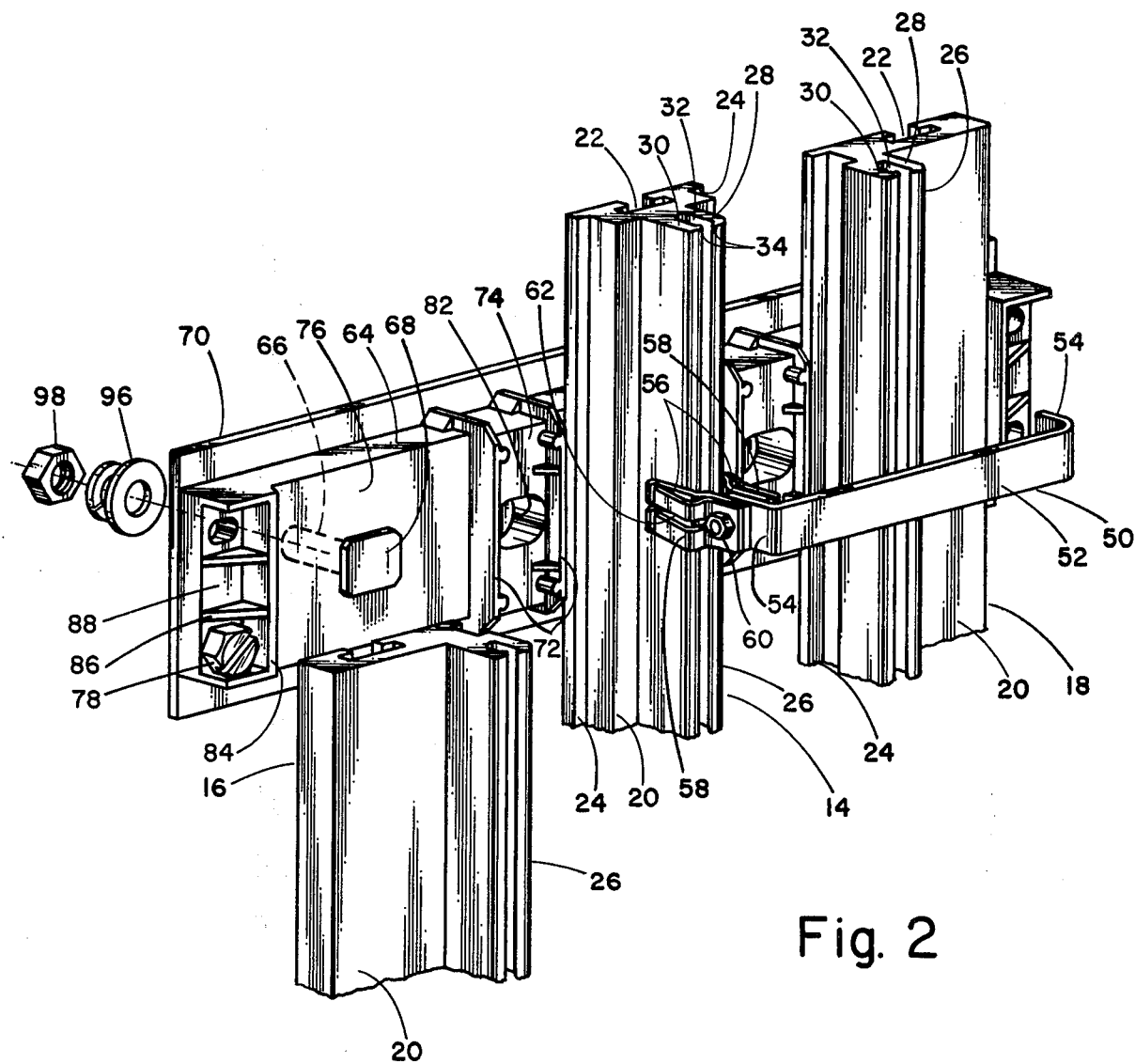
FIG. 2 is a perspective view of an insulator base showing sections of three bus bars together with a plug-on extension connector.
Figure 3:
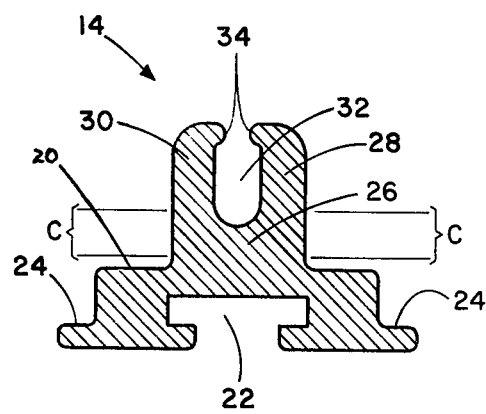
FIG. 3 is a cross-sectional view of the center bus bar.
Figure 4:
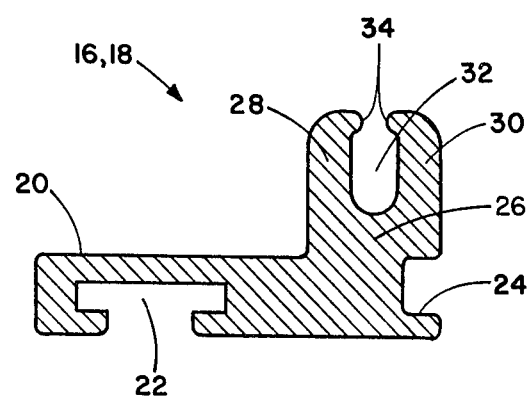
FIG. 4 is a cross-sectional view of an outer bus bar.

The bus bars are made of aluminum and can readily be extruded in the forms shown in FIGS. 2–4 of the Drawings.

As shown in FIG. 3, center bus bar 14 includes a generally rectangular base portion 20 having a T-slot 22 extending lengthwise throughout the center of the bottom part thereof and opposite lips 24 directed outward from the opposite bottom portions of base portion 20. The lips 24 extend throughout the length of the bar providing additional contact area along the base and increasing the surface area of the bus bar which facilitates dissipation of heat.

An integrally connected, generally U-shaped, plug-on portion 26 extends throughout the length of the center bus bar along the center of the top part of the base. The plug-on portion 26 includes a solid section C shown in FIG. 3 which has a bottom portion integrally connected to base portion 20 and a top portion that in spaced from the base portion and further includes opposite side legs 28 and 30 which extend upward from the top portion of the solid section and form a center indentation 32. The top of each leg includes an inwardly directed projecting portion or nub 34 which prevents inadvertent entrance of a plug-on jaw 56 into indentation 32. The plug-on jaw is shown in FIG. 2 and will be further described later.

Indentation 32 does not extend to the bottom of plug-on portion 26. A contact area is thereby provided at C which is better able to withstand the pressure of connecting jaws 56 than the upper portion of legs 28 and 30.

Outer bus bars 16 and 18 assume the configuration shown in FIG. 4. The rectangular base portion 20 of bars 16 and 18 each include a T-slot 22 along its bottom portion towards a first longitudinal edge of the base. Each outer bar also includes a plug-on portion 26 along its top portion and extending along an opposite longitudinal edge of the base. A lip 24 is also provided on the opposite edge of the base along the bottom portion thereof and located at a position in continued extending relationship to leg 30 of plug-on jaw 26. Except for the fact that the plug-on portion 26 does not extend down the center portion of base 20, the plug-on portion is fashioned in much the same manner as the plug-on portion of the center bus bar. Both include similarly dimensioned opposite leg portions 28 and 30 with inwardly directed projecting portions 34 defining indentation 32.

Approximate dimensions of the bus bars will now be given:

The overall height of each bus bar is 1.43 inches. The width of the center bus bar is 2.38 inches with the width of each outer bus bar 2.69 inches. Each plug-on portion extends upward from the rectangular base section 0.93 inches and is 0.875 inches in width. Each leg 28 and 30 of the plug-on portions is 0.28 inches in width while the projections 34 extend an additional 0.07 inches inward. Indentation 32 extends 0.65 inches into plug-on portions 26.

The T-slot in each of the bus bars includes a top portion 0.96 inches in width and 0.20 inches in height with a stem section 0.56 inches in width and 0.15 inches in height. The rectangular base 20 of the center bus bar includes a centrally located T-slot 22 and extends outward from the top leg of the T an additional 0.46 inches on each side, with lips 24 extending an additional 0.25 inches on each side and having a height of 0.15 inches.

Each outer bus bar 16 and 18 includes a rectangular base portion 20 which extends outward from the plug-on portion 26 by 1.81 inches. The upper leg of the T-slot 22 is 0.27 inches away from the outer end of the bus bar. The rectangular base extends in the opposite direction from the upper end of the T-slot an additional 1.21 inches and includes a lip 24 integrally connected at the base extending an additional 0.25 inches outward and having a height of 0.15 inches.

The panelboard assembly includes a pair of side supports 40 and 42 which are interconnected at spaced apart locations by cross supports 44. The side and cross supports are mounted on a back wall 46 of the particular panelboard or switchboard. Switches 12 are then supported by the side supports 40 and 42 and are connected via plug-on extensions 50 to each of the bus bars.

The extensions include a generally rectangular bar 52 having opposite ends 54 bent in a U-shaped manner with opposite jaw sections 56 connected to each side of one end portion of rectangular bar 52. The jaw sections 56 are further secured and retained in tight fitting relationship to the plug-on section of the bus bars by leaf springs 58. The leaf springs and jaw sections are secured to the rectangular bar by holding bolts 60 or some other fastening device. Additionally, each jaw section and spring is provided with a separating slot 62 providing two sets of relatively independent jaws on each extension 50. The leaf springs exert inward forces at the distal ends of jaws 56 which, when overlappingly engaged with plug-on portion 26, exert maximum force within contact area C shown on the center bus bar in FIG. 3.

It can be readily seen that the outer bus bars also have a similar contact area. This design provides that much of the force exerted by the jaws on the plug-on portion of the bus bars is transmitted through the full cross-section portion of plug-on portion 26 between indentation 32 and base 20. This arrangement reduces any pinching effect which would result if the indentation 32 extended to the base of the bus bar or, if the jaws were designed to receive only the top portion of plug-on portion 26.

The bus bars are mounted to insulator bases 64 via bolts 66 which include a head 68 that is locked into a fastening position within T-slot 22. The insulators 64 are mounted to the cross supports by bolts 78 or some similar fastening device at opposite ends of the insulator base and an insulating strip 70 of polyester glass is interposed between the insulator 64 and cross support 44.

Figure 5:
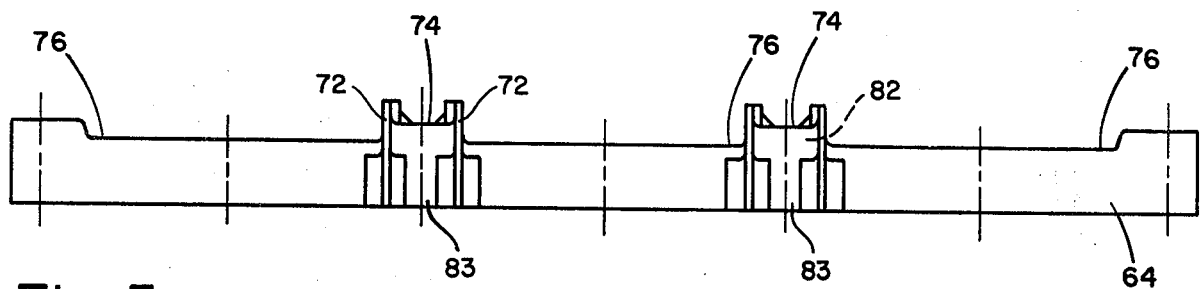
FIG. 5 is a side view of the insulator base.
Figure 6:
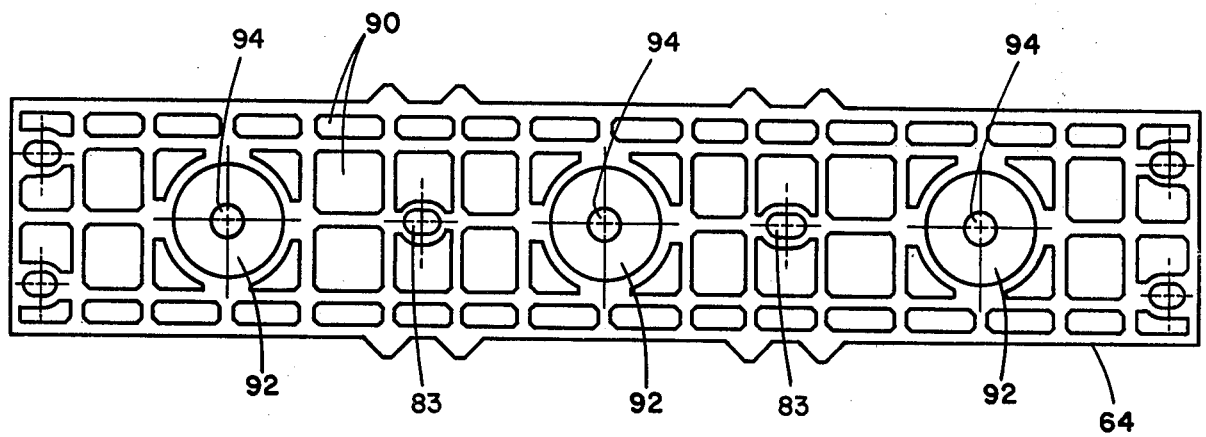
FIG. 6 is a bottom view of the insulator base shown in FIG. 5.
Figure 7:
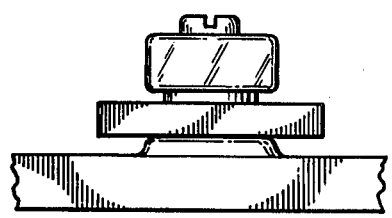
FIG. 7 is a cross-sectional view illustrating a prior art configuration.

The insulator bases 64, shown in FIGS. 2, 5 and 6, are of a generally rectangular shape and are molded of an insulating material such as Cyglas 620 which is sold by American Cyanamid Company located in Wayne, N.J.

A pair of inner ribs 72 extend across the width of the top portion of the insulator on each side of the center bus bar providing an intermediate area 74 between the center bar and each outer bar and defining separate channels 76 for each of the three bus bars. The insulator is also bolted or comparably secured to the cross support by bolts 80 located in a rib recess 82 in the intermediate area and extending through passage 83.

End ribs 84 which are reinforced by transverse ribs 86 provide additional surface distance from outer bus bars 16 and 18 to outer holding bolts 78 which are located in recessed channels 88 at opposite ends of the insulator base.

The bottom of the insulator base 64 is provided with a plurality of recesses 90 which reduce the amount of insulative material required in the base and yet provide sufficient strength and insulative qualities required in this application. Three relatively large circular recesses 92 are provided beneath the center of each channel 76. Separate passages 94 connect each of the three circular recesses with the channel portions 76, thus permitting the extension of the shafts of bolts 66 through the insulator. A washer 96 and nut 98 is received wholly within each circular recess and secures the bus bars to their respective channels.

Base 64 has a thickness of approximately 0.8 inches with inner ribs 72 extending an additional 0.53 inches upward.

Although the passages 94 are located 5 inches apart, the plug-on portions 26 of the bus bars have a 3.5 inch center spacing. Of course, various uniform spacings can be achieved by changing the location of the plug-on portions 26 and T-slots 22 of the bus bars while using the insulator base 64 above-described. Using only the bars shown in FIG. 3 or FIG. 4 which are described in detail herein, spacing of 3.5 inches, 5 inches or 6.5 inches is possible.

While the invention has particularly been shown and described with reference to a preferred embodiment it will be understood by those skilled in the art that variations in form, construction and arrangements may be made therein without departing from the spirit and scope of the invention. All such variations are intended to be covered in the appended claims.

I claim:

1. A bus bar assembly comprising:

a plurality of aluminum bus bars having a generally rectangular cross-sectioned base portion and an integrally connected generally U-shaped,cross-sectioned plug-on portion projecting upwardly therefrom and extending continuously throughout the length of said bus bar, said base portion having a T-shaped slot extending continuously throughout the length of said bus bar on the side opposite said plug-on portion; said plug-on portion comprising a solid section projecting upwardly from one side of said bus bar, said solid section having a bottom portion integrally connected to said base portion and a top portion spaced from said base portion, and including a pair of spaced apart upwardly projecting legs extending from the top portion of said solid section longitudinally along the length of the bus bar forming a center indentation; said base portion of each said bus bar having a predetermined width, said plug-on portion each having a width substantially less than said predetermined width, a plug-on extension having opposite spring held jaws in overlapping engagement with the outer edges of said projecting legs of said plug-on portion of each bus bar a plurality of parallel, spaced apart, generally rectangular insulating bases having a top portion and a bottom portion, said bases supporting said bus bars on said top portion, each insulating base including a pair of ribs intermediate adjacent bus bars and having separate channels engaged with the base of each bus bar, the bottom portion of said insulating bases having a plurality of recesses including a nut receiving recess beneath the center of each channel, said insulating bases having an aperture providing a passage from each said top channel portion to said respective nut receiving recess;

a T-bolt for each channel of each insulating base having a head received in said T-slot of a respective bus bar and a shaft extending through said respective passage; and a nut wholly contained in each said nut receiving recess threadingly receiving said T-bolt and securing each said bus bar to said respective insulating base.

2. A bus bar assembly as claimed in claim 1 including a support wall supporting each of said insulating bases;

fastening means for fastening each of said insulating bases to said support wall; and an insulating strip interposed between each of said insulating bases and said support wall, said strip covering each nut receiving recess.

3. A bus bar assembly as claimed in claim 2 wherein said legs each include an inwardly directed nub reducing the entrance to the indentation.

4. A bus bar assembly as claimed in claim 3 with said jaws exerting force on said plug-on portion along lines defining a plane extending through said solid section intermediate said indentation and said base portion.

5. A bus bar assembly as claimed in claim 3 wherein each insulating base includes portions defining a rib recess between said pair of ribs and a rib passage extending from said rib recess to the bottom portion of said base, and said fastening means comprising a bolt for each pair of ribs having a head received in each said rib recess and a shaft extending through each said rib passage securing said insulating base to said support wall.

6. A bus bar assembly as claimed in claim 5 wherein said plurality of bus bars includes a center bus bar and a pair of identical opposite outer bus bars, said center bus bar located intermediate and extending parallel to each of said outer bus bars.

7. A bus bar assembly as claimed in claim 6 wherein each said plug-on portion extends upward approximately 0.93 inches and has a width of approximately 0.875 inches.

8. A bus bar assembly as claimed in claim 6 wherein said center bus bar includes outwardly directed lips extending throughout the length of said bus bar from the base portion.

9. A bus bar assembly as claimed in claim 8 wherein each outer bar includes an outwardly directed lip extending throughout the length of the bar along a longitudinal edge of said base portion.

10. A bus bar assembly as claimed in claim 6 wherein said plug-on portion is centrally located throughout the length of the base of said center bus bar.

11. A bus bar assembly as claimed in claim 10 wherein said plug-on portions of said outer bus bars extend along said longitudinal edge of said respective bases and said plug-on portion of said center bus bar is centrally located throughout the length of the base of said center bus bar.

12. A bus bar assembly comprising:

a plurality of aluminum bus bars;

a plurality of generally rectangular insulating bases supporting said bus bars;

said bus bars each including a bottom part and a top part, said bottom parts each having a T-slot extending continuously throughout the length of said bus bar facilitating connection of said bus bar at any selected location to a respective one of said bases or to an incoming or outgoing line; said top parts each including an upwardly projecting, generally U-shaped cross-sectioned plug-on portion extending continuously throughout the entire length of said bus bar in a direction away from said T-slot;

said plug-on portion comprising a solid section projecting upwardly from one side of said bus bar, said solid section having a bottom portion integrally connected to said base portion and a top portion spaced from said base portion, and including a pair of spaced apart upwardly projecting legs extending from the top portion of said solid section longitudinally along the length of the bus bar forming a center indentation; said bottom part of each bus bar having a predetermined width, said top part each having a width substantially less than said predetermined width, a plug-on extension having opposite spring held jaws in overlapping engagement with the outer edges of said projecting legs of said plug-on portion of each bus bar each insulating base including a pair of ribs intermediate adjacent bus bars, a plurality of passages contained in each said insulating base in registration with said T-slot of a respective bus bar;

a nut receiving recess in communication with each said passage;

a T-bolt extending through each said passage having a head engaged with said T-slot; and a nut wholly contained in said recess receiving said bolt and fastening said bus bar to said base.

13. A bus bar assembly as claimed in claim 12 wherein said plurality of bus bars includes a center bus bar and a pair of identical opposite outer bus bars, said plug-on portions each extending approximately 0.93 inches upward and having a width of approximately 0.875 inches and said ribs having a height of approximately 0.53 inches.

* * * * *